United States Patent [19]

Shelton

[11] Patent Number: 4,607,877
[45] Date of Patent: Aug. 26, 1986

[54] VEHICLE BODY PANEL ARRANGEMENT

[75] Inventor: Alan J. Shelton, Rochester, Mich.

[73] Assignee: General Motors Corporation, Detroit, Mich.

[21] Appl. No.: 781,872

[22] Filed: Sep. 30, 1985

[51] Int. Cl.$^4$ ............................................. B62D 27/04
[52] U.S. Cl. ................................... 296/191; 296/31 P
[58] Field of Search ............... 296/187, 191, 196, 197, 296/29, 31 P, 39 R, 195

[56] References Cited

U.S. PATENT DOCUMENTS

| 3,550,948 | 12/1970 | Thompson, Jr. | 296/31 P X |
| 3,875,661 | 4/1975 | Lidstrom et al. | 296/191 |
| 4,438,971 | 3/1984 | Zaydel et al. | 296/191 |
| 4,529,244 | 7/1985 | Zaydel | 296/191 |

FOREIGN PATENT DOCUMENTS

| 0119668 | 9/1984 | European Pat. Off. | 296/191 |
| 1807110 | 7/1977 | Fed. Rep. of Germany | 296/29 |

*Primary Examiner*—Robert B. Reeves
*Assistant Examiner*—Russell D. Stormer
*Attorney, Agent, or Firm*—Herbert Furman

[57] ABSTRACT

A vehicle body panel arrangement includes a first panel having a bight portion provided with a terminal flange and a second panel having an edge portion resiliently held against the flange of the first panel by a deflectable portion of a clip mounted to the first panel. The clip also includes an abutment adjustable relative to the flange of the first panel to define a throat guiding insertion of the edge portion of the second panel into engagement with the flange of the first panel.

1 Claim, 4 Drawing Figures

VEHICLE BODY PANEL ARRANGEMENT

This invention relates generally to a vehicle body panel arrangement and more particularly to the attachment of vehicle body panels to each other.

In certain vehicle bodies, it is common for one panel to have an edge portion thereof secured to an edge portion of an adjacent panel. Where the securement is to be permanent, it can be accomplished by welding, brazing or adhesive. Where the securement is to be releasable, difficulties arise in obtaining such a releasable securement without shifting of the panels and rattling during vehicle operation.

The panel arrangement of this invention is particularly intended for use with plastic vehicle body panels which interfit and are to be releasably secured along edge portions thereof. In the preferred embodiment of the invention, a first vehicle body panel, such as a rear quarter outer panel, is provided with a bight end portion including a terminal flange. A structural member supports the outer panel. A second vehicle body panel such as a rear quarter inner panel covers the outer panel and the structural member and is provided with an edge portion which fits within the bight end portion of the outer panel. In order to releasably secure the edge portion of the inner panel to the flange of the bight portion of the outer panel, a clip is provided which includes a body portion and an angularly related retaining portion. The retaining portion includes a rigid leg or abutment which is located generally normal to the inner surface of the outer panel terminal flange to define a throat therewith and is spaced a predetermined distance therefrom. The width of the throat is slightly greater than the thickness of the edge portion of the inner panel. The body portion is adjustably mounted on a ramp surface of the structural member so as to set the spacing of the abutment of the clip with respect to the inner surface of the bight portion flange. The retaining portion also includes a deflectable leg which extends partially across the throat and is located inwardly of the abutment with respect to the bight portion. The abutment guides the edge portion of the inner panel as it is inserted within the throat and the deflectable portion is deflected by such edge portion into engagement with the inner surface thereof to hold the outer surface of the edge portion in engagement with the inner surface of the bight portion flange. Thus the resultant arrangement is releasable, shifting is accommodated, and noise is obviated.

The primary feature of this invention is that it provides an improved panel arrangement for vehicle bodies. Another feature is that the panel arrangement includes a first vehicle body panel having a bight portion provided with a terminal flange, a second vehicle body panel having an edge portion seating against such flange and being held in resilient engagement therewith by a clip mounted to the first panel which both guides the edge portion of the second panel into proper relationship to the bight portion flange, and resiliently holds the edge portion in engagement with such flange after insertion of the edge portion into the bight portion.

These and other features will be readily apparent from the following specification and drawings wherein.

Figure 1:
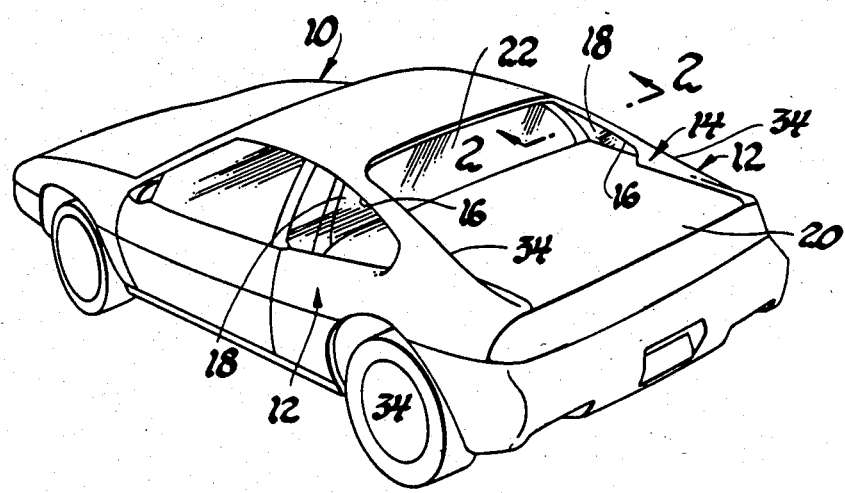
FIG. 1 is a perspective view of a vehicle having a panel arrangement according to this invention.

Referring now to FIG. 1 of the drawings, a vehicle designated generally 10 includes righthand and lefthand rear quarter outer panels 12 and rear quarter inner panels 14. The quarter panels define window openings 16 which receive glass or plastic quarter windows 18. The deck panel 20 of the vehicle extends between the righthand and lefthand pairs of panels 12 and 14 and the windows 18 and from the rear of the vehicle to the back light 22 thereof. The panels 12 and 14 are preferably formed of plastic material and there is some shifting movement possible between these panels. It is also desirable that each panel 14 be releasable from a respective panel 12 to obtain access to the space between the panels for repair or maintainance purposes.

A body structural member 24 supports each panel 12 and is part of the structural space frame of the vehicle 10. The member 24 includes an upper terminal portion of stepped configuration including a horizontal flange 26, a ramp or angled flange 28 and terminal flanges 30 and 32, the latter of which seats the inner surface of the panel 12 to support the panel adjacent the upper terminal bight portion 34 thereof. Such bight portion includes a terminal generally vertical flange 36.

The inner panel 14 has an upper edge portion 38 which is received within the bight portion 34 and seats against the flange 36 in order to complete the exterior body surface.

A clip 40 of plastic material includes a body portion 42 and a retaining portion 44. The body portion 42 includes a first leg 46, a second angular leg 48 and a terminal leg 50. An elongated slot 52 extends through legs 46 and 48, with leg 48 adjacent to the slot being recessed at 54. The leg 48 slidably bears against the flange 28 of the member 24. Screws 56 and 58 extend through the slot 52 to provide for adjustment of the clip 40 relative to the structural member 24 and fixation thereof once adjusted, as will be described.

Figure 2:
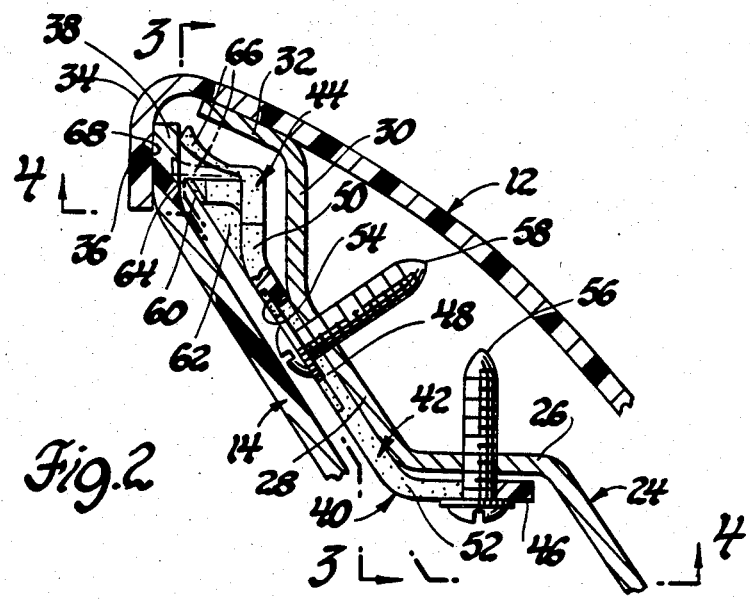
FIG. 2 is an enlarged sectional view taken along the plane indicated by the line 2—2 of FIG. 1.
Figure 4:
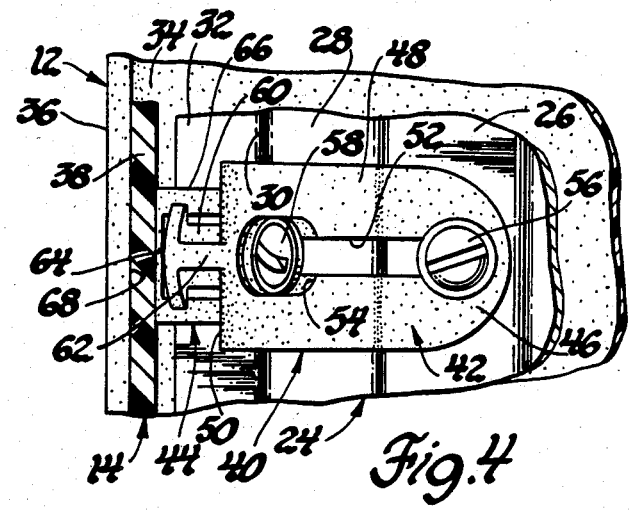
FIG. 4 is a view taken along line 4—4 of FIG. 2.

The retaining portion 44 of the clip 40 includes a T-shaped abutment 60 which extends from the leg 50 and is reinforced with respect to the leg by a rib 62. As shown in FIG. 4, the edge portion 64 of the abutment is of arcuate configuration and, as shown in FIG. 2, lies in a plane normal to the inner surface of the flange 36 of the bight portion 34. The retaining portion 44 also includes a generally U-shaped deflectable portion 66 which extends laterally from the leg 50 and is located above or inwardly of the bight portion with respect to the abutment 60.

Figure 3:
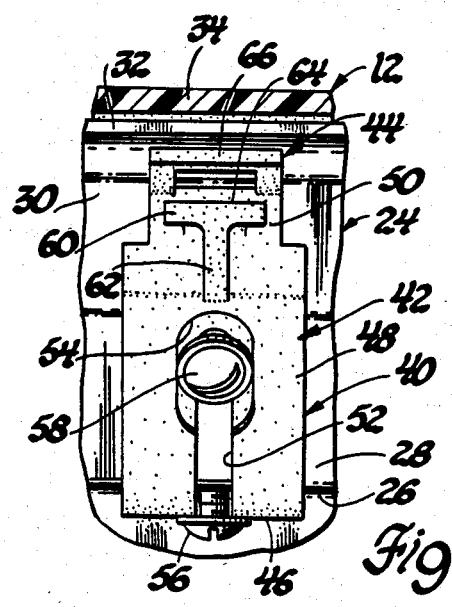
FIG. 3 is a view taken along line 3—3 of FIG. 2.

When the clip 40 is initially mounted to the member 24, screws 56 and 58 are driven through the slot 52 until the clip is loosely mounted. Thereafter the body portion 42 of the clip is slidably adjusted relative to the flange 28 of the member 24 to locate the arcuate edge 64 of the abutment 60 a predetermined distance from the inner surface of flange 36 and define therewith a throat 68. This throat is of a width slightly greater than the thickness of the edge portion 38 of panel 14. Once the width is set, the screw 58 is tightened and then the screw 56 is tightened against leg 46 of the clip. The head of the screw 58 is received within the recess 54 after being tightened as shown in FIGS. 2, 3 and 4.

When the edge portion 38 of the panel 14 is inserted into the throat 68, it is guided during insertion by the abutment edge 64, since the width of the throat is only slightly greater than the thickness of the edge portion 38. This provides for ease of insertion and without the necessity for having to visually locate the edge portion with respect to the flange 36. As the edge portion is moved through the throat, it engages the deflectable portion 66 and moves it from its dash line undeflected position shown in FIG. 2 to its full line deflected position wherein the portion 66 engages the inner surface of the edge portion 38 to resiliently hold the outer surface of the edge portion against the inner surface of flange 36. Thereafter the inner panel 14 can be releasably secured to the body as desired.

The deflectable portion of the clip 40 holds the edge portion of the inner panel resiliently against the flange of the outer panel to avoid any noise problems caused by rattling between such panels. Further, sliding movement between the panels due to bending and torsional movement during operation of the vehicle as well as movement due to extension and contraction of the plastic components is accommodated.

Thus this invention provides an improved vehicle body panel arrangement.

The ebodiments of the invention in which an exclusive property or privilege is claimed are defined as follows:

1. The combination comprising, a first vehicle body panel having a bight portion including a terminal flange, a second vehicle body panel having an edge portion thereof located within the bight portion of the first panel, and a clip for resiliently holding the outer surface of the edge portion of the second panel to the inner surface of the terminal flange of the first panel and including a body portion and a retaining portion, means mounting the body portion of the clip on a vehicle body structural member to locate the retaining portion of the clip within the bight portion of the first body panel, the retaining portion including rigid means spaced a predetermined distance from the inner surface of the terminal flange of the bight portion and defining therewith a throat permitting insertion of the edge portion of the second body panel therebetween with limited clearance, the retaining portion further including deflectable means overlying the throat and deflectable into resilient engagement with the inner surface of the edge portion of the second panel to hold the outer surface of such edge portion against the inner surface of the terminal flange of the first panel.

* * * * *